March 24, 1942.   C. W. BENNETT   2,277,290

TOOL HOLDER

Filed Sept. 13, 1940

INVENTOR
CLAUDE W. BENNETT
BY
HARRIS, KIECH, FOSTER & HARRIS

FOR THE FIRM
ATTORNEYS

Patented Mar. 24, 1942

2,277,290

UNITED STATES PATENT OFFICE 2,277,290

TOOLHOLDER

Claude W. Bennett, Lynwood, Calif.

Application September 13, 1940, Serial No. 356,635

14 Claims. (Cl. 29—96)

My invention relates to machine tools such as lathes and shapers which employ a cutting tool. It is common practice in the use of such machine tools to perform a certain sequence of operations on a series of pieces of work. Such operations are, for example, performed by a turret lathe in which bar stock is held by a chuck and acted on successively by two or more separate tools which are carried in a turret which can be rotated between operations about a vertical axis so that each tool is brought into action successively on each piece to be machined.

It is an object of the invention to provide an attachment for an ordinary lathe so that this lathe can be used on work that ordinarily requires a turret lathe. This I accomplish by providing a tool holder with quickly detachable means for inserting and removing tools in and from said holder, so that a tool may be removed and then reinserted in the original position in the holder so as to provide the so-called "dialing effect" of a turret lathe without the use of the complicated construction required in such a turret lathe.

Further objects and advantages will be made evident hereinafter.

In the drawing, which is for illustrative purposes only:

Figure 1:
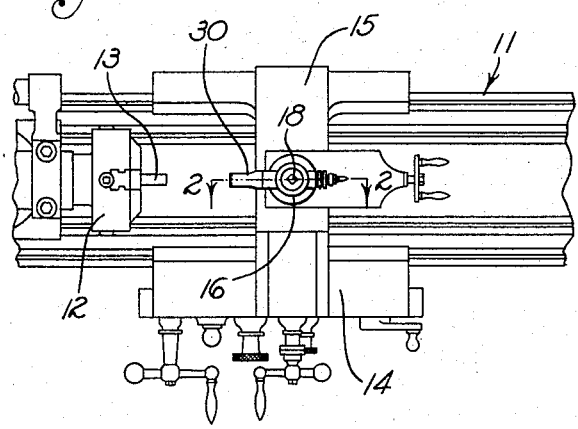
Fig. 1 is a plan view showing how my invention is used in an ordinary lathe.
Figure 4:
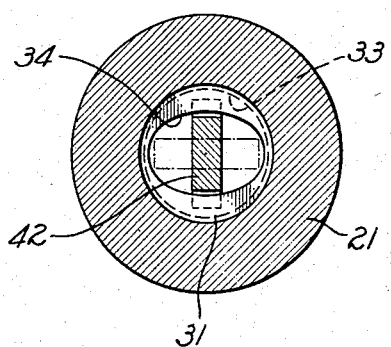
Fig. 4 is a section on the line 4—4 of Fig. 2.

In the drawing, 11 is the lathe having a chuck 12 in which bar stock 13 is held. The lathe is equipped with a carriage 14 which can be moved along a line parallel to the axis of rotation of the stock 13 and a cross slide 15 is carried on the carriage 14 and movable transversely of the carriage. The cross slide 15 carries a tool post 16 having a cylindrical opening 17 therein in which a cylindrical body may be clamped by a set screw 18. The above parts are common to metal working lathes as now commonly constructed.

My invention comprises a novel form of tool holder for use in the opening 17 of the post 16.

For the purpose of accomplishing the objects of my invention I provide a cylindrical member 21 which is clamped in the opening 17 of the post 16 by the set screw 18. The member 21 is threaded at 22 for a nut 23 which is locked against turning by a set screw 24. The other end of the member 21 is provided with a conical socket 25 and a flat key 26 is provided on the end thereof on each side of the socket 25.

A variety of tools may be used. All of the tools are formed with or secured to shanks 30. Each shank 30 is provided with a conical end 31 fitting in the socket 25 and is provided with keyways 32 so that when the conical end 31 of the shank 30 is pulled solidly into engagement with the walls of the conical socket 25, the shank cannot rotate in this socket. The end of the shank 30 is provided with a cylindrical recess 33 and with an elongated opening 34 extending inwardly from the end of the shank 30 to the recess 33. It will be apparent to those skilled in the art that although I have shown a tool formed on the shank 30, the tool may be made separately therefrom and suitably secured to the shank in any manner well known in the art. By this provision it will be understood that a single shank 30 may be used to hold any desired number of different tools.

The member 21 is provided with a central opening through which a rod 41 passes. This rod 41 has a flattened T-shaped end 42 which can be inserted into the cavity 33 through the opening 34 but which when turned from its entering position in said cavity 33 engages the wall of the cavity adjacent to the opening 34. It will be evident to those skilled in the art that if desired the T-shaped end 42 may be formed on the inner end of the shank 30 and that the cavity 33 may be formed in the end of the rod 41 without departing from the spirit of my invention. The rod 41 is threaded at 43 in the nut 23 and is provided with a handle 44 by which it may be turned. The nut 23 is provided with a cylindrical extension 51 on which a dog 52 is mounted, this dog being free to turn on said extension and to be locked in any position by a set screw 53. The dog 52 has a tail 54 which projects into the path of the handle 44 for the purpose of limiting its movement.

Figure 2:
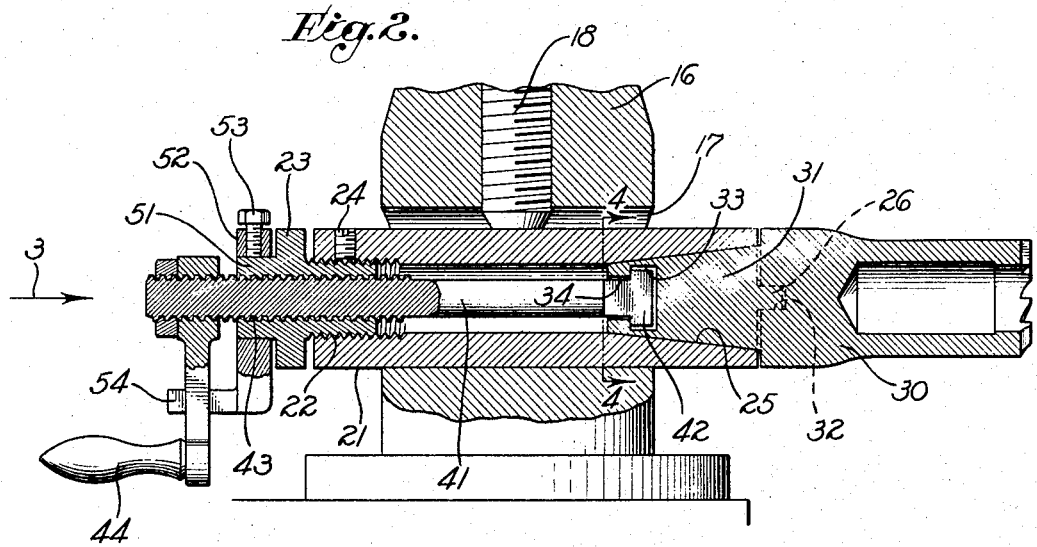
Fig. 2 is a section on an enlarged scale on a plane represented by the line 2—2 of Fig. 1.
Figure 3:
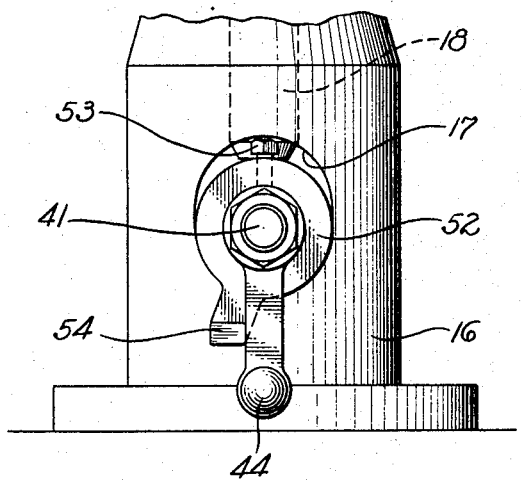
Fig. 3 is an end view.
Figure 5:
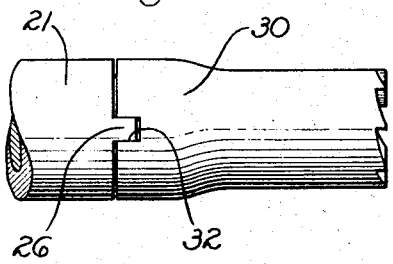
Fig. 5 is a fragmentary side view.

The method of operation is as follows:

The rod 41 is turned by the handle 44 so that the head 42 can enter the opening 34 as the conical extension 31 of the shank 30 is pushed into the socket 25 in such a position that the keys 26 engage the keyways 32. The rod is then turned through an angle of about 90° so that the head 42 is transverse to the opening 34. The set screw 24 being backed off so that the nut 23 can be turned, this nut is turned in such a manner as to pull the rod to the left as seen in Fig. 2, thus seating the head 42 of the rod 41 in the recess 33 and pulling the extension 31 into a firm seat in the cavity 25. This firmly locks the shank 30 in the member 21. The nut 23 is then locked in the member 21 by the set screw 24. If the rod 41 is now turned by the handle 44 through an angle of about 90° in a direction such that the rod 41 is forced to the right as viewed in Fig. 2 due to its rotation in the nut 23, the pressure between the conical end 30 of the shank 31 and the walls of the cavity 25 is released and the head 42 is turned so that the head will pass through the opening 34 and the shank 30 may be removed from its position in the member 21. The dog 52 is set by loosening the set screw 53 and turning the dog on the nut into a position such that after the handle 44 is turned to lock a shank in place, the tail 54 prevents the handle 44 from being turned any further.

In practice, the operator has several shanks 30 each carrying a tool suited to perform a certain operation on the stock 13. He places the first tool in the member 21 and locks it in place by turning the handle 44 until it hits the tail 54 of the dog 52. As soon as the operation on the stock which is performed by this tool is finished the operator releases the shank of the tool by turning the handle 44 and he can secure the next desired tool in the member 21. If, as is commonly required, a particular tool must be removed and then reinserted in the tool holder, as for example when a particular working operation is interrupted by other work to be done on the lathe, my invention is adapted to permit the original tool to be reinserted in the tool holder in exactly the same position as it originally occupied therein, thus permitting the resumption of a particular operation at any time without resetting the position of the tool holder relative to the work. Thus, it will be appreciated, my invention may be utilized as a substitute for the standard form of turret lathe well known in the art.

This quick releasing device enables successive operations to be quickly performed on the stock 13 by changing tools as described with very little loss of time in so changing.

I claim as my invention:

1. A device of the character described in the foregoing specification comprising the combination of: a body member; a tool-carrying shank fitting into one end of said body member, said shank and body being formed for interlocking engagement to prevent said shank from turning in said body when fitted into said body, and being further formed to provide a firm seat for said shank when fitted in said body; a rod passing through a central opening in said body and provided with means at its inner end for detachably engaging the inner end of said shank; and means for exerting tension on said rod while said last mentioned means engages said shank, so that said rod pulls said shank to said firm seat in said body.

2. A device of the character described in the foregoing specification comprising the combination of: a body member having a conical seat formed in one end thereof; a tool-carrying shank fitting into said conical seat, said shank and body being formed for interlocking engagement to prevent said shank from turning in said body when fitted into said conical seat; a rod passing through a central opening in said body and provided with means at its inner end for detachably engaging the inner end of said shank; and means for exerting tension on said rod while said last mentioned means engages said shank, so that said rod pulls said shank to a firm engagement with said conical seat in said body.

3. A device of the character described in the foregoing specification comprising the combination of: a body member; a tool-carrying shank fitting into one end of said body member, said shank and body being formed for interlocking engagement to prevent said shank from turning in said body when fitted into said body, and being further formed to provide a firm seat for said shank when fitted in said body; a rod passing through a central opening in said body and provided with means at its inner end for detachably engaging the inner end of said shank; a nut threaded in said body at the end thereof opposite that in which said shank is seated, said rod being threaded in said nut; and means for rotating said rod, so that said rod pulls said shank to said firm seat in said body.

4. A device of the character described in the foregoing specification comprising the combination of: a body member having a conical seat formed in one end thereof; a tool-carrying shank fitting into said conical seat, said shank and body being formed for interlocking engagement to prevent said shank from turning in said body when fitted into said conical seat; a rod passing through a central opening in said body and provided with means at its inner end for detachably engaging the inner end of said shank; a nut threaded in said body at the end thereof opposite that in which said shank is seated, said rod being threaded in said nut; and means for rotating said rod, so that said rod pulls said shank to a firm engagement with said conical seat in said body.

5. A device of the character described in the foregoing specification comprising the combination of: a body member; a tool-carrying shank fitting into one end of said body member, said shank and body being formed for interlocking engagement to prevent said shank from turning in said body when fitted into said body, and being further formed to provide a firm seat for said shank when fitted in said body; a rod passing through a central opening in said body and provided with means at its inner end for detachably engaging the inner end of said shank; a nut threaded in said body at the end thereof opposite that in which said shank is seated, said rod being threaded in said nut; a handle fixed on said rod so that said rod may be rotated in said nut; and adjustable means for limiting the rotation of said handle.

6. A device of the character described in the foregoing specification comprising the combination of: a body member having a conical seat formed in one end thereof; a tool-carrying shank fitting into said conical seat, said shank and body being formed for interlocking engagement to prevent said shank from turning in said body when fitted into said conical seat; a rod passing through a central opening in said body and provided with means at its inner end for detachably engaging the inner end of said shank, a nut threaded in said body at the end thereof opposite that in which said shank is seated, said rod being threaded in said nut; a handle fixed on said rod so that said rod may be rotated in said nut; and adjustable means for limiting the rotation of said handle.

7. A device of the character described in the foregoing specification comprising the combination of: a body member; a shank fitting into one end of said body member and provided with means preventing said shank from turning in said body; a rod passing through a central opening in said body and provided with means for detachably engaging said shank; a nut threaded in said body at the end thereof opposite that in which said shank is seated, said rod being threaded in said nut; a handle fixed on said rod so that said rod may be rotated in said nut; a dog mounted so that it may be rotated on said nut and provided with means by which it may be locked against rotation in an angular position on said nut; and a tail on said dog projecting into the path of said handle and limiting the rotation of said handle.

8. A device of the character described in the foregoing specification comprising the combination of: a body member having a conical seat formed in one end thereof; a shank fitting into said conical seat and provided with means preventing said shank from turning in said body; a rod passing through a central opening in said body and provided with means for detachably engaging said shank; a nut threaded in said body at the end thereof opposite that in which said shank is seated, said rod being threaded in said nut; a handle fixed on said rod so that said rod may be rotated in said nut; a dog mounted so that it may be rotated on said nut and provided with means by which it may be locked against rotation in an angular position on said nut; and a tail on said dog projecting into the path of said handle and limiting the rotation of said handle.

9. A device of the character described in the foregoing specification comprising the combination of: a body member; a shank fitting into one end of said body member and provided with means preventing said shank from turning in said body; a rod passing through a central opening in said body and provided with means for detachably engaging said shank; a nut threaded in said body at the end thereof opposite that in which said shank is seated, said rod being threaded in said nut; means for locking said nut against angular rotation in said body; and means for rotating said rod, so that said rod pulls said shank to a firm seat in said body.

10. A device of the character described in the foregoing specification comprising the combination of: a body member having a conical seat formed in one end thereof; a tool-carrying shank fitting into said conical seat, said shank and body being formed for interlocking engagement to prevent said shank from turning in said body when fitted into said conical seat; a rod passing through a central opening in said body and provided with means at its inner end for detachably engaging the inner end of said shank; a nut threaded in said body at the end thereof opposite that in which said shank is seated, said rod being threaded in said nut; means for locking said nut against angular rotation in said body; and means for rotating said rod, so that said rod pulls said shank to a firm engagement with said conical seat in said body.

11. A device of the character described in the foregoing specification comprising the combination of: a body member; a shank fitting into one end of said body member and provided with means preventing said shank from turning in said body; a rod passing through a central opening in said body and provided with means for detachably engaging said shank; a nut threaded in said body at the end thereof opposite that in which said shank is seated, said rod being threaded in said nut; means for locking said nut against angular rotation in said body; a handle fixed on said rod so that said rod may be rotated in said nut; and adjustable means for limiting the rotation of said handle.

12. A device of the character described in the foregoing specification comprising the combination of: a body member having a conical seat formed in one end thereof; a shank fitting into said conical seat and provided with means preventing said shank from turning in said body; a rod passing through a central opening in said body and provided with means for detachably engaging said shank; a nut threaded in said body at the end thereof opposite that in which said shank is seated, said rod being threaded in said nut; means for locking said nut against angular rotation in said body; a handle fixed on said rod so that said rod may be rotated in said nut; and adjustable means for limiting the rotation of said handle.

13. A device of the character described in the foregoing specification comprising the combination of: a body member; a shank fitting into one end of said body member and provided with means preventing said shank from turning in said body; a rod passing through a central opening in said body and provided with means for detachably engaging said shank; a nut threaded in said body at the end thereof opposite that in which said shank is seated, said rod being threaded in said nut; means for locking said nut against angular rotation in said body; a handle fixed on said rod so that said rod may be rotated in said nut; a dog mounted so that it may be rotated on said nut and provided with means by which it may be locked against rotation in an angular position on said nut; and a tail on said dog projecting into the path of said handle and limiting the rotation of said handle.

14. A device of the character described in the foregoing specification comprising the combination of: a body member having a conical seat formed in one end thereof; a shank fitting into said conical seat and provided with means preventing said shank from turning in said body; a rod passing through a central opening in said body and provided with means for detachably engaging said shank; a nut threaded in said body at the end thereof opposite that in which said shank is seated, said rod being threaded in said nut; means for locking said nut against angular rotation in said body; a handle fixed on said rod so that said rod may be rotated in said nut; a dog mounted so that it may be rotated on said nut and provided with means by which it may be locked against rotation in an angular position on said nut; and a tail on said dog projecting into the path of said handle and limiting the rotation of said handle.

CLAUDE W. BENNETT.